US008711682B2

(12) United States Patent
Weitkemper et al.

(10) Patent No.: US 8,711,682 B2
(45) Date of Patent: Apr. 29, 2014

(54) METHOD FOR RESOURCE ALLOCATION IN A WIRELESS COMMUNICATION NETWORK, METHOD FOR ERROR-FREE TRANSMISSION OF INFORMATION, NODE AND WIRELESS COMMUNICATION NETWORK

(75) Inventors: Petra Weitkemper, Germering (DE); Hidekazu Taoka, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 135 days.

(21) Appl. No.: 13/303,420

(22) Filed: Nov. 23, 2011

(65) Prior Publication Data

US 2012/0134317 A1  May 31, 2012

(30) Foreign Application Priority Data

Nov. 25, 2010  (EP) .................................... 10192598

(51) Int. Cl.
H04L 12/26  (2006.01)

(52) U.S. Cl.
USPC .......................................... 370/226; 370/315

(58) Field of Classification Search
USPC ................................. 370/226, 315
See application file for complete search history.

(56) References Cited

U.S. PATENT DOCUMENTS

| 6,366,763 | B1 * | 4/2002 | Ue et al. ........................ 455/69 |
| 7,697,948 | B2 | 4/2010 | Wan et al. |
| 2003/0021240 | A1 * | 1/2003 | Moon et al. ................... 370/320 |
| 2007/0190934 | A1 | 8/2007 | Kim et al. |
| 2009/0262678 | A1 | 10/2009 | Oyman et al. |
| 2009/0313518 | A1 | 12/2009 | Shen et al. |
| 2010/0003977 | A1 | 1/2010 | Pinheiro et al. |
| 2010/0017672 | A1 | 1/2010 | Suga |
| 2011/0128893 | A1 | 6/2011 | Park et al. |
| 2012/0044870 | A1 | 2/2012 | Mochizuki et al. |
| 2013/0012218 | A1 | 1/2013 | Ohta et al. |

FOREIGN PATENT DOCUMENTS

| EP | 2 426 842 A1 | 3/2012 |
| JP | 2010/504665 A | 2/2010 |
| JP | 2011/514109 A | 4/2011 |
| JP | 2011/529318 A | 12/2011 |
| JP | 2012/016067 A | 1/2012 |
| JP | 2012/257318 A | 12/2012 |
| WO | WO 2008/129677 A1 | 10/2008 |
| WO | WO 2009/131867 A2 | 10/2009 |
| WO | WO 2010/093332 A1 | 8/2010 |
| WO | WO 2011/114429 A1 | 9/2011 |

OTHER PUBLICATIONS

Extended European Search Report for European Application No. 10192598.0, dated Apr. 29, 2011, 6 pages.
Office Action from Japanese Application No. 2011-257452, dated Mar. 26, 2013, 2 pages.
Cheng, J.F., Wong, Y. P., Parkval, S., "Adaptive Incremental Redundancy," pp. 737-741 IEEE VTC 2003—Oct. 4, 2003, © 2003 IEEE.
Qi, Y., Hoshyar, R., Tafazolli, R., "On the Performance of HARQ with Hybrid Relaying Schemes," pp. 1-6, IEEE ICC 2009 proceedings, © 2009 IEEE.

* cited by examiner

Primary Examiner — Gary Mui
(74) Attorney, Agent, or Firm — Brinks Gilson & Lione

(57) ABSTRACT

An approach for resource allocation in a wireless communication network including a sender, a relay station and a receiver in case of a retransmission of information from the relay station to the receiver is described, wherein a resource necessary for retransmission is determined on the basis of the relayed channel and the relay function.

14 Claims, 6 Drawing Sheets

S: source (UE: for the uplink case)
D: destination (eNB: for the uplink case)

METHOD FOR RESOURCE ALLOCATION IN A WIRELESS COMMUNICATION NETWORK, METHOD FOR ERROR-FREE TRANSMISSION OF INFORMATION, NODE AND WIRELESS COMMUNICATION NETWORK

RELATED APPLICATIONS

This application claims priority under 35 U.S.C. §119 to European Patent Application No. 10192598.0-1249 filed on Nov. 25, 2010, the entire content of which is hereby incorporated by reference.

Embodiments of the invention relate to the field of wireless communication networks, more specifically to wireless communication networks including a sender, a relay station and a receiver, wherein the relay station is provided for relaying information transmitted from the sender to the receiver. More specifically, embodiments of the invention concern an approach for resource allocation in a wireless communication network in case of a retransmission of information from the relay station to the receiver, e.g., an adaptive resource allocation in a system using relays or relay stations and operating in accordance with the HARQ protocol (HARQ=Hybrid Automatic Repeat Request).

BACKGROUND OF THE INVENTION

1. Field of the Invention

In conventional wireless communication networks, e.g., a cellular system, relays or relay stations are used to support the communication between a sender (source) and a receiver (destination) of the cellular system. The cellular system including the relay station may support the HARQ protocol. In such a scenario the source transmits information to the destination, e.g., via the relay station, and the code rate is matched to the channel (1st hop) between the source and the relay station. The destination may receive signals both directly from the source and via the relay station. The signals are combined and decoded at the destination. In case the destination fails to decode a received signal a negative acknowledgement message (NAK message—negative acknowledgement message) is issued. In response to the NAK message a retransmission is initiated in accordance with the HARQ protocol. In a known system, in case of such a negative acknowledgement not the source but the relay station is controlled to do the retransmission. This may be beneficial if the channel (2nd hop) between the relay station and the destination is better (e.g., has a better channel quality) than the direct channel between the source and the destination, which is quite likely. In a packet-based radio communication network the HARQ protocol is an important technique that allows an error-free transmission by requesting the retransmitting of any falsely decoded packet data. Known HARQ protocols/schemes are the Case Combining (CC) scheme and the Incremental Redundancy (IR) scheme.

In accordance with the information theory a successful decoding of a strong code like, e.g., a turbo-code or a LDPC code means that the mutual information (MI) ($I(X;Y)$) of a channel is larger than the code rate ($R_c$), wherein the behavior of $I(X;Y)$ depends on SNR (SNR=Signal-to-Noise Ratio), i.e., $I(X;Y)=f(SNR)$. Using the HARQ protocol allows for the retransmission of falsely decoded packets or signals thereby increasing $I(X;Y)$ to exceed the code rate $R_c$.

FIG. 1 illustrates the dependence of the mutual information $I(X,Y)$ on a distance between a source and a destination. FIG. 1A schematically illustrates a source S and a destination D. In case of an uplink, the source may be a user equipment UE, and the destination may be a base station eNB. The mutual information $I(X,Y)$ defines the average information that leaves the source S at location X and reaches the destination D at location Y. Therefore, the mutual information $I(X,Y)$ should be at a maximum. To ensure a successful decoding at the destination, the mutual information $I(X,Y)$ needs to be greater than the code rate $R_c$. FIG. 1B depicts a graphical representation of the course of the mutual information $I(X,Y)$ dependent on the distance between the source and the destination. As can be seen, the longer the distance between the source and the destination, the lower the mutual information $I(X;Y)$, and at some point it falls below the threshold $R_c$ set by the code rate. Below the threshold decoding at the destination will fail. The HARQ scheme is an approach that allows for a retransmission which will result in an increase of the mutual information $I(X;Y)$ thereby exceeding $R_c$ and thereby allowing longer distances between the source and the destination.

2. Description of the Related Art

U.S. Pat. No. 7,697,948 B2 describes an approach for retransmitting bits using the HARQ scheme but without using a relay station. US 2007/0190934 A1 describes a communication system using relay stations operating in accordance with a specific relay mode which is selected based on the mutual information MI. However, the HARQ protocol is not described. Y. Qi, R. Hoshyar and R Tafazolli describe in "On the Performance of HARQ with Hybrid Relaying Schemes," in IEEE ICC 2009, a wireless communication system using relay stations and the HARQ protocol. The mutual information is used to switch between two preset relay functions. Thus, in conventional technology systems using relay stations and operating in accordance with the HARQ protocol the relay station is simply used for the retransmission under the assumption that the relay station is in the position to correctly decode the entire code word which can then be retransmitted. Resources needed for the retransmission are not considered.

SUMMARY OF THE INVENTION

According to an embodiment, a method for resource allocation in a wireless communication network including a sender, a relay station and a receiver in case of a retransmission of information from the relay station to the receiver may have the step of: determining a resource that may be used for the retransmission based on the relayed channel and the relay function.

According to another embodiment, a node in a wireless communication network including a sender, a relay station and a receiver may have: a processor configured to allocate a resource in case of a retransmission from the relay station to the receiver, wherein the processor is configured to determine the resource that may be used for the retransmission based on the relayed channel and the relay function.

According to another embodiment, a method for error-free transmission of information between the sender and a receiver of a wireless communication network, the wireless communication network further including a relay station may have the steps of: transmitting a codeword from the sender to the receiver, in case the codeword is falsely detected at the receiver, requesting a retransmission of information from the relay station, allocating the resource for retransmission by the relay station in accordance with a method for resource allocation in a wireless communication network including a sender, a relay station and a receiver in case of a retransmission of information from the relay station to the receiver, which method may have the step of: determining a resource necessary for retransmission based on the relayed channel and the relay function, and performing the retransmission using the allocated resource from the relay station to the receiver to enable the receiver to decode the codeword after the retransmission with the predefined probability.

According to another embodiment, a wireless communication network may have: a sender; a receiver configured to receive a codeword from the sender and to request a retransmission in case the codeword is falsely detected; and a relay station configured to cause a retransmission of information in case the receiver falsely decoded the codeword, wherein at least one of the sender, the receiver and the relay station is configured as a node in a wireless communication network including a sender, a relay station and a receiver, which node may have: a processor configured to allocate a resource in case of a retransmission from the relay station to the receiver, wherein the processor is configured to determine the resource necessary for retransmission based on the relayed channel and the relay function.

Another embodiment has a computer program product including a program including instructions stored by a computer-readable medium, the instructions executing a method for resource allocation in a wireless communication network including a sender, a relay station and a receiver in case of a retransmission of information from the relay station to the receiver, which method may have the step of: determining a resource necessary for retransmission based on the relayed channel and the relay function, when running the program on a computer.

In accordance with embodiments of the invention, the resource is determined at the relay station or at any other node in the wireless communication network, wherein in case the resource is determined at any other node in the wireless communication network, the method further comprises signaling the resource for retransmission to the relay station.

In accordance with an embodiment the sender or source may be configured to send a codeword to the receiver or destination, wherein a retransmission is requested in case the receiver falsely decodes the codeword, and wherein the information is retransmitted to the receiver by the relay station to decode the codeword after the retransmission with a predefined probability at the receiver.

In accordance with an embodiment, the relayed channel may comprise at least one of the channel between the sender and the receiver, the channel between the sender and the relay station, and the channel between the relay station and the receiver. The relayed channel may comprise the channel between the sender and the relay station, and at least one of the channel between the sender and the receiver, and the channel between the relay station and the receiver.

In accordance with embodiments, the relayed channel is described or characterized on the basis of a channel quality which may be determined on the basis of the mutual information (MI), the probability density function (pdf), or the log-likelihood ratios (LLR) of the relayed channel. The relay function implemented at the relay station may comprise any arbitrary selected relay function, for example a detect-and-forward (DetF) function, a decode-and-forward (DF) function, an estimate-and-forward (EF) function and an amplify-and-forward (AF) function. EF here means the transmission of the conditional mean of the symbol.

In accordance with embodiments, the codeword is transmitted using the hybrid automatic repeat request, wherein the resource is the number of bits or a power for retransmission by the relay station. In accordance with this embodiment, a chase combining (CC) approach for retransmission of parts of the initially transmitted bits or an incremental redundancy (IR) approach for retransmission of different bits of the original codeword may be used. In this case, the considered relayed channel may comprise the channels between the sender and the relay station, between the sender and the receiver, and between the relay station and the receiver, wherein each channel is described by its signal-to-noise ratio (SNR). The ratio of the number of bits for the retransmission over the number of bits for the initial transmission is as follows:

in case of IR: $p > (R_c - f(SNR_{SD}))/f(SNR_{SR}, SNR_{RD})$, in case of CC: $p > (R_c - f(SNR_{SD}))/f(SNR_{SR}, SNR_{SD}, SNR_{RD}) - f(SNR_{SD}))$ with: p=the ratio of the number of bits for the retransmission over the number of bits for the initial transmission, $R_c$=the code rate of the initial transmission, $SNR_{RD}$=the signal-to-noise-ratio for the channel between the sender and the receiver, $SNR_{SR}$=the signal-to-noise-ratio for the channel between the sender and the relay station, $SNR_{RD}$=the signal-to-noise-ratio for the channel between the relay station and the receiver, and f(SNR)=function describing the mutual information depending on the SNR value of one or more channels.

When compared to conventional approaches, in accordance with embodiments of the invention, an improved method is provided allowing for a resource allocation at a relay station optimizing the resource use at the relay station. The rate of the relay transmission is chosen to enable the destination to decode the overall code word successfully, but not more than necessary to avoid a waste of resources so that in accordance with embodiments of the invention an intelligent coordination of the number of bits to be transmitted by the relay station is achieved. The resource that may be used for retransmission (e.g., the number of bits or the power) is determined on the basis of the relay function implemented in the relay station and on the basis of the relayed channel. Also the case without a successful decoding at the relay station may be considered, because in case the code rate of the initial transmission is chosen too high, the relay station would not be able to help in the transmission. On the other hand, a relay station able to apply channel decoding may be too complex or too power consuming.

In accordance with embodiments, the invention provides a method to determine the minimum number of code bits to be additionally transmitted by a relay station in an HARQ scheme if a retransmission is requested, depending on a state of the system that is characterized by the SNR values of one or more of the channels between the source, the destination and the relay station, and the relay function, for example the AF function or the EF function. More specifically, in accordance with this embodiment, a method is proposed to obtain the number of additional bits transmitted by the relay in case of a NAK message from the destination. The number of additional bits depends on the state of all involved channels, for example on the basis of the SNR, and on the functionality of the relay station, dependent on whether the amplify-forward (AF) function, the detect-forward (DetF) function or the estimate-forward (EF) function is applied. Naturally, extensions to other relay functions are possible.

Embodiments of the invention are advantageous over conventional approaches as a possibility is offered to save a significant amount of physical resources which may lead to a higher throughput compared to state of the art techniques. The higher throughput is economically beneficial because either one user can receive a higher data rate or the necessitated transmission power can be reduced for a fixed data rate.

BRIEF DESCRIPTION OF THE DRAWINGS

Embodiments of the present invention will be detailed subsequently referring to the appended drawings, in which:

FIG. 1 illustrates the dependence of the mutual information or trans-information I(X,Y) on a distance between a source and a destination, wherein FIG. 1A schematically illustrates a source S and a destination D, and wherein

FIG. 3 illustrates the tradeoff between frame error rate (FER) and necessitated resources, wherein FIG. 3A depicts the error rate performance, wherein FIG. 3B depicts the reduction of retransmitted resources, and wherein

FIG. 4 depicts the improvement in accordance with the inventive approach, wherein FIG. 4A describes schematically the system of FIG. 2, and wherein

DETAILED DESCRIPTION OF THE PREFERRED EMBODIMENTS

Embodiments of the invention will now be described on the basis of a wireless communication system as the one shown in FIG. 2.

Figure 2:
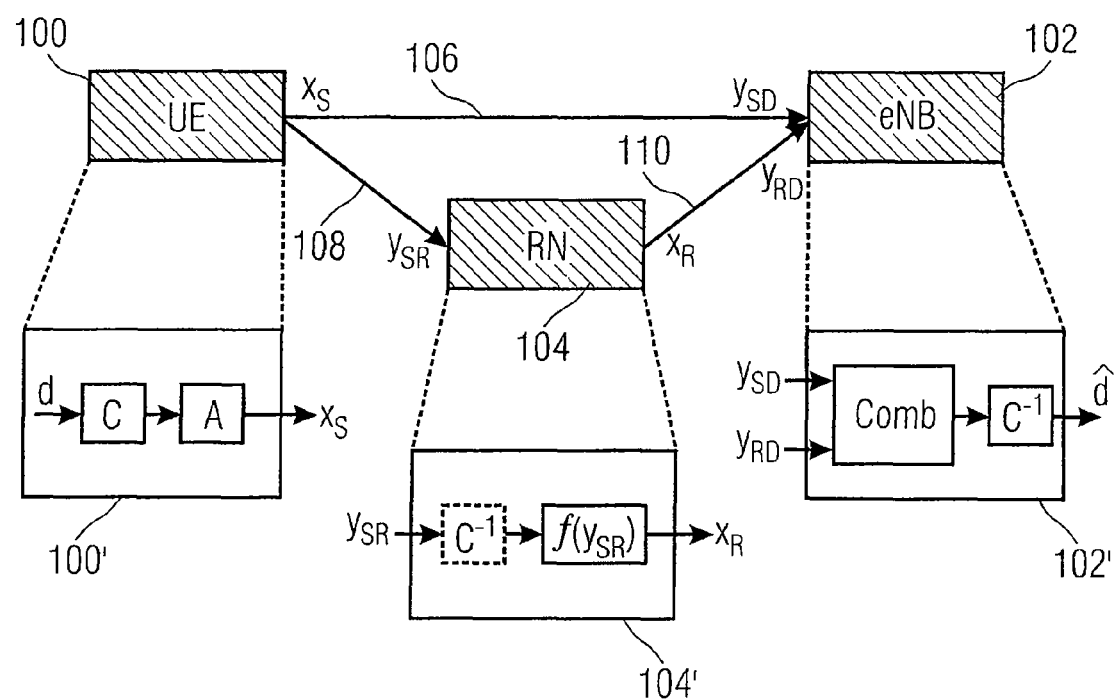
FIG. 2 shows a system model of a three-terminal system having a source, a destination, and a relay station.

FIG. 2 shows a system model of a three-terminal system. The system comprises a source 100, for example a user equipment UE, a destination 102, for example a base station eNB, and a relay station or relay node (RN) 104. At the source 100, as depicted by the block 100' a signal d (e.g., a codeword or packet) to be transmitted to the destination 102 is coded by a channel coder C and modulated by a modulator A to output the source signal $x_S$. As is schematically shown in FIG. 2, a first channel 106 exists between the source 100 and the destination 102 so that at the destination 102 the transmitted source signal $y_{SD}$, is received. The wireless communication system further comprises a second channel (1st hop) 108 between the source 100 and the relay station 104. Via the channel 108 the relay station 104 receives the signal $y_{SR}$ which is the source signal transmitted via the second channel 108 from the source 100 to the relay station 104. The relay station 104 receives the signal $y_{SR}$, as shown in block 104'. The relay station 104 may be configured to perform a channel decoding at a channel decoder $C^{-1}$ followed by a relay function $f(y_{SR})$ that yields a relay station signal $x_R$ that is transmitted via a third channel (2nd hop) 110 to the destination 102 which receives in addition to the transmitted source signal $y_{SD}$ the transmitted relay station signal $y_{RD}$. At the destination, as shown schematically at block 102', the transmitted source signal $y_{SD}$ and the transmitted relay station signal $y_{RD}$ are combined by the combiner COMB and the combined signal is channel decoded to yield the transmitted information signal d. Blocks 100', 102' and 104' of the source 100, the destination 102 and the relay station 104, respectively, may comprise a processor device for performing the above mentioned signal processing of the respective signals.

FIG. 2 shows a system configuration including a "type 2 relay", namely a system configuration using a direct path via the first channel 106 and a relay path via the channels 108 and 110 and via the relay station 104 wherein both paths are received by the destination 102 and may be separated by the TDD (Time-Division Duplexing) or FDD (Frequency-Division Duplexing). At the relay station 104, various approaches may be used, for example one approach is not to use any decoding at the relay station, so that the block $C^{-1}$ may be optional which yields a simple and cheap relay station 104. The relay functions $f(y_{SR})$ or relay protocols may comprise any known protocol, for example the amplify-forward (AF) protocol, the detect-forward (DetF) protocol and the estimate-forward (EF) protocol. Also, a REL-10 LTE (LTE-advanced) relay station may be used.

When using a relay station as shown e.g., in FIG. 2 for retransmitting information to a destination or receiver, the question is how many additional bits the relay station should retransmit. If the mutual information at the receiver is only marginally smaller than the desired MI, the transmission of the same number of bits as in the initial transition from the source or sender would be a waste of resources. However, if the number of bits is chosen too small, the decoding may fail again and an additional transmission is needed which increases the delay. In view of the complex link over the relay station, the calculation of the minimum number of additional bits that may be used is not a straight forward task and other critical points are to be considered, for example to keep the calculation simple to make it easily applicable in the communication systems.

The invention provides a simple method to obtain the minimum number of bits to be retransmitted taking the parameters of the relay link into account. For example, parameters that may be used are the relay functionality (AF, DETF or EF) and the SNR on both links, i.e., the link or channel between the source and the destination via the relay station and the direct link or channel between the source and the destination. Based on these parameters, the effective mutual information (MI) of the link depending from the number of retransmitted bits can be calculated. Considering the fact that for strong codes, e.g., turbo codes successful decoding is possible, when the MI of the input signal is larger than the code rate, the minimum number of retransmitted bits can be calculated with a single formula as shall be discussed in further detail below.

Figure 3A:
Figure 3B:
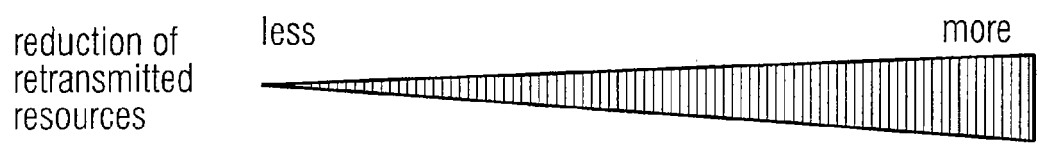
Figure 3C:
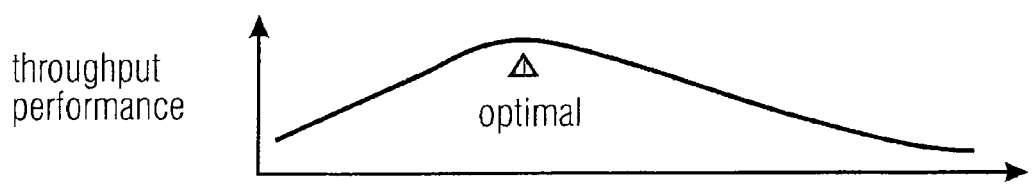
FIG. 3C depicts the throughput performance.

The MI of the input signal is increased and, in general, the MI or I(X;Y) can be scaled by puncturing bits to be retransmitted. Thus, by adjusting the fraction of bits, a tradeoff between a frame error rate (FER) and resource utilization can be found. The challenge is how to determine the number of retransmitted bits considering the tradeoff between FER and resources that may be used. FIG. 3 illustrates this situation, wherein FIG. 3A depicts the resulting error rate performance, FIG. 3B depicts the reduction of retransmitted resources and FIG. 3C depicts the throughput performance. As can be seen from FIGS. 3A and 3B, the less resources are saved for retransmission, better the error rate performance is and, vice versa, the more resources are saved the worse the error rate performance gets. As can be derived from FIG. 3C the optimal throughput performance is somewhere between the maximum and minimum values of the error performance rate and the resources that need to be retransmitted.

For example, in case the code rate $R_c=0.5$ and the signal-to-noise ratio SNR=0 dB and the mutual information I(X;Y) =0.48 the retransmission of a whole codeword would be a waste of resources as only the fraction of data may be used to achieve the additional MI of 0.02. While state of the art resource optimization approaches are known, it is noted that such approaches are not suited for systems using a relay station and, more specifically, conventional technology does not suggest taking into account the relayed channel and the relay function for resource optimization in case of a retransmission. Embodiments of the invention provide an improvement of the total resources, for example the number of bits or the retransmission power needed in case of a retransmission.

The relay, like the relay station 104 shown in FIG. 2, supports a communication link in terms of retransmission in case of a NAK message from the destination 102. The resources needed for the retransmission are to be minimized. In case of a decode-forward relay function, it is assumed that the relay will only help if it decoded the received information successfully. In this case, one can select between transmitting the same codeword and transmitting additional parity bits. Transmitting the same codeword is done in accordance with the chase combining (CC) approach. The incremental redundancy (IR) approach calculates additional parity bits at the relay station. However, in accordance with embodiments, it may be desirable that the relay station does not perform any channel decoding to avoid unnecessary complexity at the relay station and unnecessary power consumption. In such a case, the relay station may apply any memoryless relay function, for example the AF function, the DetF function or the EF function. The EF function provides a better performance than the AF function and the DetF function. The gain in terms of mutual information MI at the receiver is significantly higher for the EF function than for the other two functions. However, in case of a memoryless relay station only the CC approach can be applied. Nevertheless, dependent on the relay deployment, the relay can still improve the system performance in terms of FER, throughput or delays.

In accordance with embodiments of the invention, an approach is described for obtaining the minimum amount of additional resources needed to be allocated, for example a minimum amount of additionally transmitted bits in order to enable the destination to decode the message. The idea of taking mutual information to calculate a number of bits that may be used for a retransmission (both for chase combining and incremental redundancy) is described by J. F. Chang Y. P. Wong and S. Parkval, "Adaptive Incremental Redundancy" in IEEE VTC 2003-4, October 2003, however, this document does not describe applying these techniques to a relay network which, as shall be shown below is not a straight forward task. Due to Shannon's law, an error-free transmission is possible as long as the channel capacity is larger than the code rate $R_c$. If the source applies a channel code with a code rate of 0.8, the mutual information MI at the input of the decoder should be larger than 0.8. If the channel is too noisy, the decoding will fail and a NAK message may be sent to the source and the relay station. The initiated retransmission should add exactly that amount of additional MI to the signal at the decoder input so that the overall MI is above the code rate. In practical systems a certain margin should be added to calculate target MI, as practical channel codes have a certain loss compared to the described bound.

In case of the chase combining approach, this is achieved by puncturing the estimated code word at the relay and transmit only as may symbols as necessary. At the receiver, the initial transmission and the retransmission are combined properly (e.g., by the signal processor provided by block 102' of FIG. 2) and fed to the channel decoder. In case of a partial CC and retransmission by the source or in case of a linear relaying, some symbols have a higher effective SNR than others and the overall MI can be expressed as follows:

$$MI_{CC}(N_r) = \frac{N_t - N_r}{N_t} \cdot I(SNR_1) + \frac{N_r}{N_t} \cdot I(SNR_1 + SNR_2) \quad (1)$$

where I(SNR) is the total MI of the considered modulation scheme for a certain SNR $N_t$ is to the number of bits transmitted in the first transmission, and Nr denotes the number of bits selected for retransmission. The sum of the SNRs in I(SNR1+SNR2) is valid for a linear relaying function, such as AF. A more general notation would be I(SNR1, SNR2). The calculation of $MI_{CC}(N_r)$ for different relay functions will be shown below. These functions may either be calculated online or may be stored in a look-up table (LUT). The effective MI of the retransmitted bits depends on the individual properties of both transmissions. The number of bits to be retransmitted to obtain $$MI_{CC}(N_r)) \rangle R_c. \quad (2)$$

i.e., the amount of MI is larger than code rate $R_c$, can be calculated as $$N_r \rangle N_t \frac{R_c - I(SNR_{SD})}{I(SNR_{SD}, SNR_{SR}, SNR_{RD}) - I(SNR_{SD})} \quad (3)$$

In a system without a relay station and a constant SNR the number of retransmitted bits should be $$N_r \rangle N_t \frac{R_c - I(SNR_{SD})}{I(2 \cdot SNR_{SD}) - I(SNR_{SD})} \quad (4)$$

If the effective SNR of the relay path is larger than the SNR of the direct path, the number of retransmitted bits that may be used decreases and physical resources may be saved. In case of a successful DF function, i.e., a perfect recovery of the transmitted code word, the effective SNR of the relay path is equal to the SNR of the second hop.

In case of the AF function, the resulting MI can be calculated as $$I(SNR_{SR}, SNR_{RD})_{AF} = I\left(SNR_{eff} = \frac{SNR_{SR} \cdot SNR_{RD}}{SNR_{SR} + SNR_{RD} + 1}\right) \quad (5)$$

In case of the EF function which is known to provide the maximum MI of the memoryless relay functions, the MI of the relay path can be calculated based on the analytically known LLRs (log likelihood ratios) or pdfs (probability density functions) that may be derived in accordance with the teachings of EP patent application 10174928.1. Due to chase combing of the bits, the combined LLRs or pdfs have to be considered for MI calculation but in the case of BPSK or QPSK, this can be simplified. A similar approach is possible if the DetF relay function is applied at the relay station. Also, in this case analytical expressions for the LLRs of pdfs can be obtained in order to calculate the minimum number of bits that may be used.

For all cases, expressions for LLR or pdf of the retransmitted bits can be used directly to calculate MI. This calculation of MI is based on the general formula for the MI assuming discrete symbol alphabets $$MI = I(X;Y) \quad (6)$$

$$= \sum_x \int_{-\infty}^{\infty} p(x,y) \log_2\left(\frac{p(x,y)}{p(x)p(y)}\right) dy \quad (7)$$

$$= \sum_x \int_{-\infty}^{\infty} p(x)p(y|x) \log_2\left(\frac{p(y|x)}{(y)}\right) dy \quad (8)$$

Usually, it is assumed that all symbols are equally likely, meaning p(x)=1/ld(M) with M denoting the cardinality of the symbol alphabet. In that case, only the probability density function p(y|x) is needed to calculate the MI analytically. In all considered cases, AF, EF and DetF, the pdfs only depend on the SNRs of the two hops. For the AF relay function and unit transmit power, this can be expressed as $$p(y_{RD}|x) = \frac{1}{\sqrt{2\pi\sigma_{\it eff}^2}} \exp\left(-\frac{|y_{RD}-x|^2}{2\sigma_{\it eff}^2}\right) \quad (9)$$

being a simple Gaussian distribution with an effective noise variance $$\sigma_{\it eff}^2 = \sigma_R^2 + \sigma_D^2 + \sigma_R^2 \sigma_D^2 \quad (10)$$

In case of the DetF function, the probability density function becomes $$p(y_{RD}|x) = \sum_x p(y_{RD}|x_R)p(x_R|x) \quad (11)$$

wherein $x_R$ is the symbol transmitted by the relay station, and $p(x_R|x)$ denotes the transition probability, i.e., the probability that the relay decides in favor of symbol $x_R$ if the source transmitted symbol x. Due to the hard decision based solely on the received signal, this pdf for a BPSK transmission can be expressed as $$p(y_{RD}|x) = p(y_{RD}|x_R=x)(1-P_e) + p(y_{RD}|x_R=-x)P_e \quad (12)$$

$$= \frac{1}{\sqrt{2\pi\sigma_D^2}} \exp\left(-\frac{|y_{RD}-x|^2}{2\sigma_D^2}\right)(1-P_e) +$$

$$\frac{1}{\sqrt{2\pi\sigma_D^2}} \exp\left(-\frac{|y_{RD}+x|^2}{2\sigma_D^2}\right) P_e$$

The error probability $P_e$ depends on the SNR of the first hop (channel between the source S and the relay station R) and can be calculated by $$P_e = \tfrac{1}{2} \mathrm{erfc}(\sqrt{SNR_{SR}}) \quad (13)$$

For the EF function which is an advantageous relay function the pdf becomes $$p(y_{RD}|s) = \int_{-\infty}^{\infty} p(y_{RD}|f(y_{SR})) \cdot p(y_{RD}|s) dy_{SR} \quad (14)$$

with $y_{SR}$ denoting the received signal at the relay and $f(y_{SR})$ describing the relay function, which in case of EF is $$f(y_{SR}) = \beta E\{s|y_{SR}\} \quad (15)$$

For the simple case of BPSK, the pdf becomes $$p(y_{RD}|s) = \quad (16)$$

$$\int_{-\infty}^{\infty} \exp\left(\frac{-\sigma_R^2|y_{RD} - \beta\tanh(2y_{SR}/\sigma_R^2)|^2 - \sigma_D^2|y_{SR}-s|^2}{2\sigma_D^2\sigma_R^2}\right) dy_{SR}$$

With the equations 9, 12 and 16, the number of bits that may be used additionally can be calculated analytically.

It is noted that the notation I(SNR1+SNR2) is valid if both signals are only disturbed by Gaussian noise as is true for the AF function. In case of a non-linear relay function, such as DetF and EF, the MI of the combined signal is calculated slightly different. The combination of both signals in the case of chase combining has to be done within the calculation of the pdfs in equations 12 and 16. This combination is done by multiplying the densities for the direct link and the relayed link. Instead of using $p(y_{RD}|s)$ for calculating MI in equation 6, the product of the two pdfs corresponding to the two observations can be used.

$$p(y|s) \propto p(y_{RD}|s)p(y_{SD}|s) \quad (17)$$

Besides relaying functions using chase combining, also relaying functions including channel decoding can be used. In case of DF and successful decoding, the IR approach can be applied instead of the CC approach. In some cases, the IR approach may be better than the CC approach. Instead of the DF relay function, also DEF, an extension of the EF relay function to channel decoding may be used either for CC or IR. The procedure of calculating the number of additional bits is different for IR, as the MI is averaged over the different transmissions instead of summing up the SNR values.

$$MI_{RI}(N_r) = \frac{N_t}{N_t + N_r} \cdot I(SNR_{SD}) + \frac{N_r}{N_t + N_r} \cdot I(SNR_{SR} + SNR_{RD}) \quad (18)$$

This value should be larger than the code rate which decreases in case of IR as new code bits or parity bits are generated. All transmitted bits constitute an effective code which is of lower rate than the code rate of the initial transmission. Therefore, MI has to be larger than this effective code rate $$MI_{RI}(N_r) > \frac{N_t}{N_t + N_r} R_c \quad (19)$$

and the number of additional code bits that may be used equals $$N_r > N_t \frac{R_c - I(SNR_{SD})}{I(SNR_{SR}, SNR_{RD})} \quad (20)$$

In this case, no combining of several observations about a bit is required, just the MI of the relay path has to be calculated.

Thus, when considering the general description of the wireless system depicted in FIG. 2 in accordance with the inventive approach, a retransmission is done by the relay station 104 because retransmitting the information by the relay station will yield a higher MI. Further, in accordance with the inventive approach, the relay function and the signal-to-noise ratios of the access link (the third channel 110), the backhaul link (the second channel 108) and the direct link (the first channel 106) are taken into account to determine the optimum number of bits for retransmission by the relay station 104. In general, the ratio p of the number of bits for retransmission over the number of bits for the initial transmission is as follows:

in case of IR: $p > (R_c - f(SNR_{SD})/f(SNR_{SR}, SNR_{RD})$,
in case of CC: $p > (R_c - f(SNR_{SD})/f(SNR_{SR}, SNR_{SD}, SNR_{RD}) - f(SNR_{SD}))$
with: p=the ratio of the number of bits for the retransmission over the number of bits for the initial transmission,
   $R_c$=the code rate of the initial transmission,
   $SNR_{RD}$=the signal-to-noise-ratio for the channel 108 between the sender and the receiver,
   $SNR_{SR}$=the signal-to-noise-ratio for the channel 106 between the sender and the relay station,
   $SNR_{RD}$=the signal-to-noise-ratio for the channel 110 between the relay station and the receiver, and
   f(SNR)=function describing the mutual information depending on the SNR value of one or more channels.

Figure 1A:
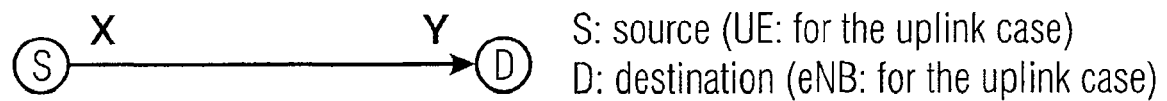
Figure 1B:
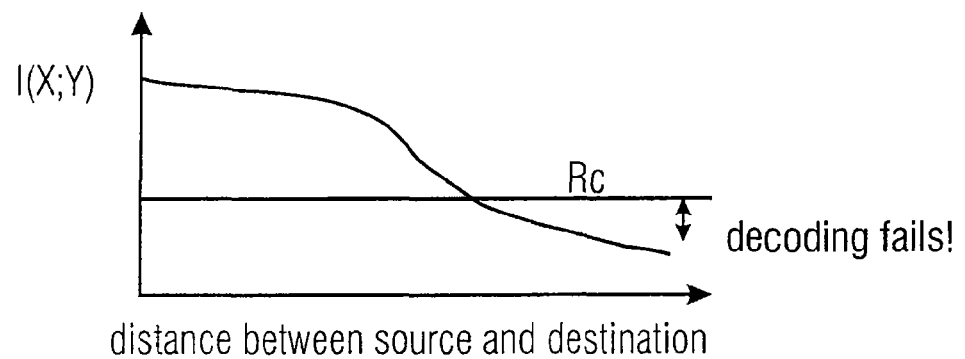
FIG. 1B depicts a graphical representation of the course of the mutual information I(X,Y) dependent on the distance between the source and the destination.
Figure 4A:
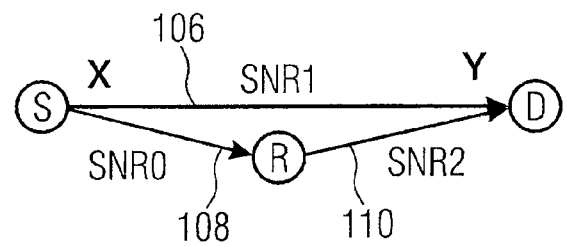
Figure 4B:
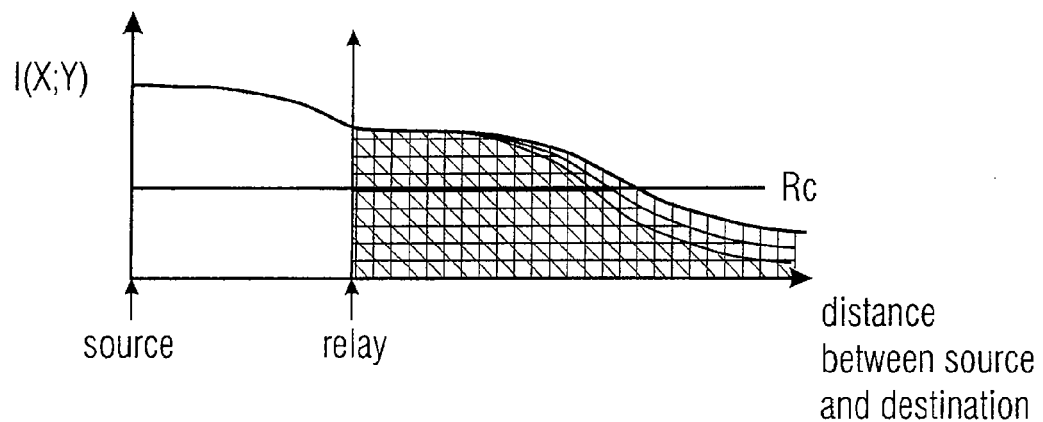
FIG. 4B illustrates the improvement.

FIG. 4 depicts the improvement achievable with regard to the distance between the source and the destination using the relay station for transmitting the bits calculated in accordance with the inventive approach. FIG. 4A describes schematically the system of FIG. 2 showing the source S and the destination D connected via the first channel 106 as well as the relay station R connected via the third channel 110 to the destination. Also, the channel 108 between the source and the relay station is depicted. As can be seen from FIG. 4B, by means of the relay station R, the MI is maintained at a level above the code rate for a longer distance between the source and the destination, when compared to conventional approaches, see for example FIG. 1B.

The inventive approach is advantageous as resources can be saved in case of a retransmission. While the relayed channel is expected to be better than the direct link, a minimum number of bits that may be used can be calculated very simply considering the relay functionality and the SNRs on the respective channels in a way as discussed above.

Further, a higher throughput is achievable by choosing larger MCS at the initial transmission, especially in the uplink the channel quality of the relay backhaul link is better and more constant in comparison with the direct link so that a further reduction of the number of bits or power needed for retransmission can be expected. Thus, in accordance with embodiments the relay's benefit is fully exploited in combination with the HARQ approach.

Figure 5:
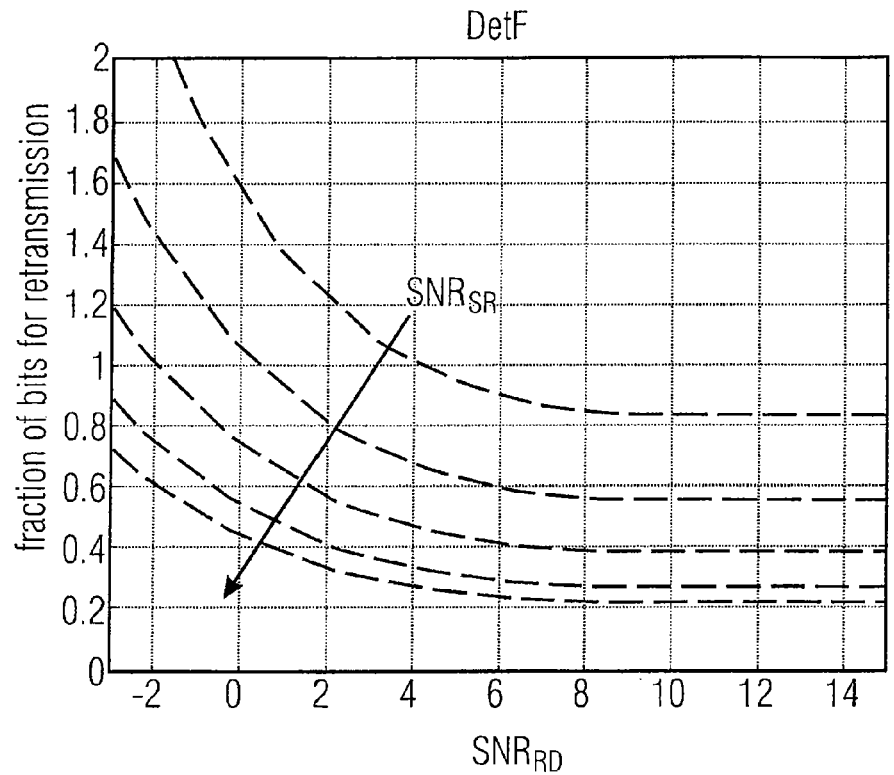
FIG. 5 is a graph showing the optimum fractions of bits retransmitted by a relay station using a DetF relay function.
Figure 6:
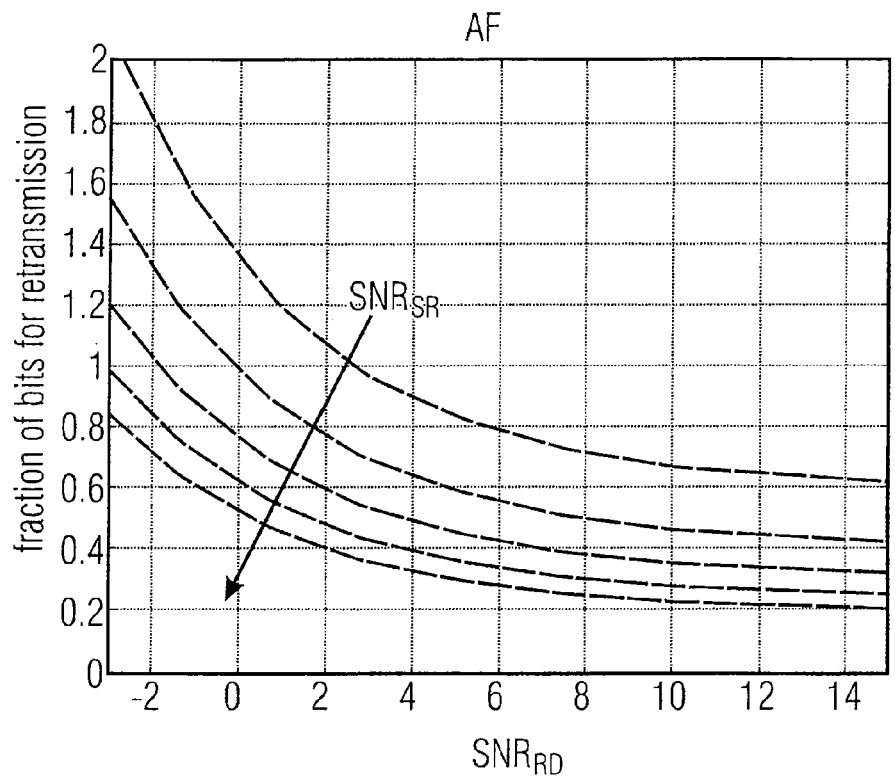
FIG. 6 is a graph showing the optimum fractions of bits retransmitted by a relay station using an AF relay function.
Figure 7:
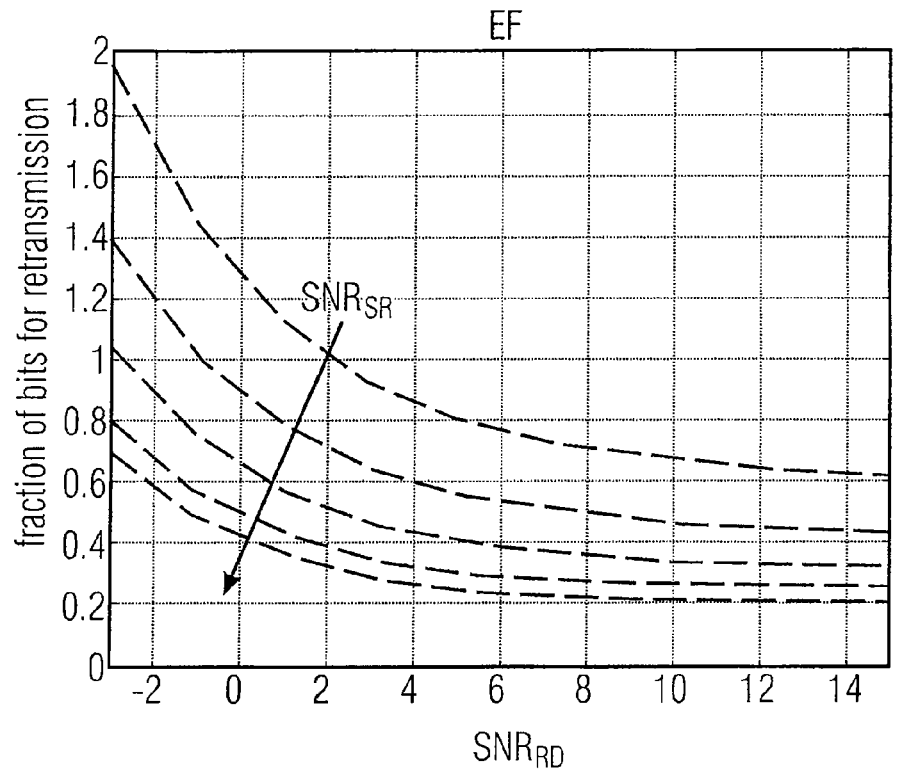
FIG. 7 is a graph showing the optimum fractions of bits retransmitted by a relay station using an EF relay function.

The possible gain using the inventive approach will be discussed subsequently with reference to FIGS. 5 to 8. For a code rate of 0.33 and a SNR of −5 dB on the direct path or first channel 106 the minimum fractions of bits to be retransmitted using a relay station applying, for example the EF relay function are shown in FIG. 7. FIG. 7 shows the resource saving in comparison with the relay transmitting the whole codeword thereby showing the gain achievable by the inventive approach. It can be seen that the gain for the EF relay function in comparison to the AF relay function and the DET relay function depicted in FIGS. 5 and 6 is more significant. FIG. 6 shows the optimum fraction of retransmitted bits for the AF relay function assuming a fixed MCS: QPSK, a code rate $R_c$ of 0.33 and a SNR of −5 dB on the direct link. The relay station uses the AF function without channel decoding at the relay station. As can be seen, there is a significant gain in comparison with the state of the art approaches using a retransmission of the whole word. The use of the relay station is beneficial and results in up to 80% saving of resources after applying the inventive approach.

Figure 8:
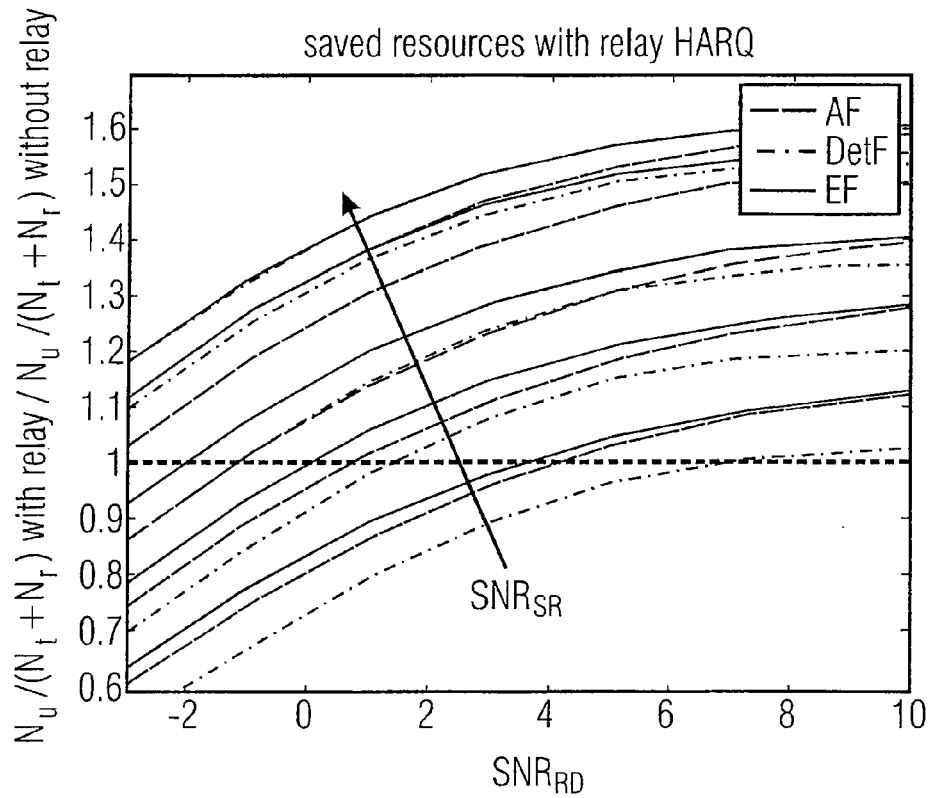
FIG. 8 is a graph showing the effective rate for a relay station applying the AF-relay function, the DetF relay function or the EF relay function without channel decoding and the ratio of the effective rate with and without a relay station.

The difference between the relay functions can be seen from FIG. 8. FIG. 8 shows the effective rate for a relay station applying the AF relay function, the DetF relay function or the EF relay function without channel decoding and assuming, like in FIG. 6, a fixed MCS: QPSK with a code rate $R_c$ of 0.33 and a SNR of −5 dB on the direct link. FIG. 8 shows the ratio of the effective rate with and without a relay station wherein the rate with the relay station is clearly higher for most cases so that the use of a relay station is beneficial in most of the cases and results in a rate increase up to 60%. As can be seen, the EF relay function is better than the AF relay function and gains up to 10%. For the same system setup, the ratio between the effective rate with and without relay is shown. The minimum amount of retransmitted bits is assumed in all cases also for the retransmission by the source. So a value greater than 1 indicates the additional gain achievable by the inventive approach.

In accordance with embodiments, the retransmission is done by the relay station using the resources that were allocated in accordance with the inventive approach discussed above. In accordance with embodiments for the allocation or calculation of the resource knowledge about the respective SNR values associated with the respective channels (the channels between the source, the destination and the relay) is useful. In such embodiments, the relay station may be aware of the SNR values for the channel between the sender and the relay station and for the channel between the relay station and the receiver. In case allocating the resource also necessitates knowledge about the SNR value for the channel between the sender and the receiver this SNR value needs to be signaled to the relay station either from the sender or form the receiver.

In accordance with other embodiments, determination of the resources to be allocated for the transmission from the relay station to the destination needs not to be done at the relay station itself, rather, it can be done at any node within the wireless communication system. For example, the calculation can be done at the destination and can only be carried out in case of a NAK message so that together with this message also the resources needed for retransmission may be signaled to the relay station which, on the basis of the received information starts the retransmission. Also, the determination of the resources may be done at the source node or at any other node within the network provided a signaling of the resources determined to the relay station occurs. Again, for the allocation or calculation of the resource at the node knowledge about the respective SNR values associated with the respective channels between the sender, the receiver and the relay station may be used and may be signaled to the node. For example, in an embodiment the destination (receiver) may calculate the resources on the basis of all SNR values, i.e., it needs to know all SNR values. Some of them may be estimated directly at the destination, but some may have to be signaled. In this case the SNR value for the channel form the source to the relay cannot be estimated at the destination but has to be signaled from the relay. The same applies when the source calculates the resources, i.e., while some of the SNR values (e.g., the values for the channel between the source and the destination and for the channel between the source and the relay) may be estimated directly at the source, the SNR value for the channel form the relay to the destination cannot be estimated at the source but has to be signaled from the relay to the source. In case another node calculates the resources, all SNR values may be signaled to this node so that it can calculate the resource and forward it to the relay.

In accordance with further embodiments, a count of intelligent non-acknowledgement message (intelligent NAK) may be provided. The relay station may send an acknowledgement message or a negative acknowledgement message to the destination to indicate whether and how it could support the transmission. If the relay station knows that it could decode the transmission successfully, for example by an MI check before decoding, the destination can adapt to this in the calculation of the number of bits. On the other hand, in case of using an EF relay function or an AF relay function, the relay station may signal the quality of its signal by either the SNR or the MI at the output of the relay station which, in turn, enables the destination to calculate the number of bits needed. If the relay station has knowledge of the SNR of the second hop it can calculate the total MI of the number of bits itself and signal this to the destination.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer. A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein. A further embodiment comprises a computer having installed thereon the computer program for performing one of the methods described herein. In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A method for resource allocation in a wireless communication network comprising a sender, a relay station and a receiver, the method comprising:
   receiving, with the receiver, signals from the sender and the relay station, the receiver combining and decoding the received signals,
   in response to the receiver failing to decode a received signal, initiating retransmission of information from the relay station to the receiver, and
   determining a resource necessary for the retransmission of information based on a channel quality of a channel between the sender and the receiver via the relay station, a channel quality of a direct channel between the sender and the receiver, and a relay protocol, the relay protocol being a basis upon which the relay station operates.

2. The method of claim 1, wherein the resource is determined at the relay station or at any other node in the wireless communication network, wherein in case the resource is determined at any other node in the wireless communication network, the method further comprises signaling the resource for the retransmission to the relay station.

3. The method of claim 1, wherein the sender is configured to send a codeword to the receiver, wherein retransmission is requested in case the receiver falsely decodes the codeword, and wherein the information is retransmitted to the receiver from the relay station to decode the codeword, after the retransmission, with a predefined probability at the receiver.

4. The method of claim 1, further comprising signaling, to the node where the resource is determined, one or more parameters that may be used for determining the resource.

5. The method of claim 4, wherein the parameter that may be used comprises one or more of the signal-to-noise ratios for the channels between the sender, the receiver and the relay station, and wherein a signal-to-noise ratio is signaled to the node in case it cannot be determined at the node.

6. The method of claim 1, wherein the channel quality is determined based on mutual information, a probability density function or a log-likelihood ratio of the channels between the sender, the receiver and the relay station.

7. The method of claim 1, wherein the relay protocol comprises at least one of a detect-and-forward protocol, a decode-and-forward protocol, an estimate-and-forward protocol, or an amplify-and-forward protocol.

8. The method of claim 1, wherein a codeword is transmitted using a hybrid automatic repeat request, and wherein determining the resource for retransmission comprises at least one of determining a number of bits to be retransmitted by the relay station or determining a power level for the retransmission by the relay station.

9. The method of claim 8, wherein chase combining (CC) for retransmission of parts of the initially transmitted bits or incremental redundancy (IR) for retransmission of different bits of the transmitted codeword is used.

10. The method of claim 9, wherein the channels between the sender, the receiver and the relay station are described by their signal-to-noise-ratio, wherein a ratio of a number of bits for the retransmission over a number of bits for the initial transmission (p) is:

in case of IR: $p > (R_c - f(SNR_{SD}))/f(SNR_{SR}, SNR_{RD})$, in case of CC: $p > (R_c - f(SNR_{SD}))/f(SNR_{SR}, SNR_{SD}, SNR_{RD}) - f(SNR_{SD}))$ with:

p=the ratio of the number of bits for the retransmission over the number of bits for the initial transmission, $R_c$=a code rate, $SNR_{SD}$=a signal-to-noise-ratio for the channel between the sender and the receiver, $SNR_{SR}$=a signal-to-noise-ratio for the channel between the sender and the relay station, $SNR_{RD}$=a signal-to-noise-ratio for the channel between the relay station and the receiver, and f(SNR)=function describing mutual information depending on the SNR value of one or more channels.

11. A method for transmission of information between a sender and a receiver over a wireless communication network, the wireless communication network further comprising a relay station, the method comprising:

transmitting a codeword from the sender to the receiver, in case the codeword is falsely decoded at the receiver, requesting a retransmission of information from the relay station, allocating a resource for retransmission by the relay station in accordance with a method for resource allocation in the wireless communication network including the sender, the relay station and the receiver, wherein the receiver is configured to receive, combine and decode signals received from the sender and the relay station, wherein in case the receiver fails to decode a received signal, a retransmission of information from the relay station to the receiver is initiated, and wherein allocation of the resource for retransmission by the relay station is determined based on a relay protocol upon which the relay station operates, a channel quality of a channel between the sender and the receiver via the relay station, and a channel quality of a direct channel between the sender and the receiver, and performing the retransmission using the allocated resource from the relay station to the receiver to enable the receiver to decode the codeword, after the retransmission, with a predefined probability.

12. A non-transitory computer-readable medium comprising a program comprising instructions executable by a computer, the computer-readable medium comprising:

instructions to execute a method for resource allocation in a wireless communication network including a sender, a relay station and a receiver, wherein the receiver receives, combines and decodes signals from the sender and the relay station, and instructions to initiate retransmission of information from the relay station to the receiver in a case where the receiver fails to decode a received signal; and instructions to determine a resource for retransmission of information from the relay station to the receiver based on a relay protocol upon which the relay station operates, a channel quality of a channel between the sender and the receiver via the relay station, and a channel quality of a direct channel between the sender and the receiver.

13. A node in a wireless communication network, the wireless communication network comprising a sender, a relay station and a receiver, the node comprising:

a processor configured to allocate a resource in case of a retransmission from the relay station to the receiver in accordance with a method for resource allocation in the wireless communication network including the sender, the relay station and the receiver, wherein the receiver is configured to receive, combine and decode signals from the sender and the relay station, wherein in a case where the receiver fails to decode a received signal, a retransmission of information from the relay station to the receiver is initiated, and wherein a resource necessary for retransmission is determined based on a relay protocol upon which the relay station operates, a channel quality of a channel between the sender and the receiver via the relay station, and a channel quality of a direct channel between the sender and the receiver.

14. A wireless communication network, comprising:

a sender;

a receiver configured to receive a codeword from the sender and to request a retransmission in case the codeword is falsely decoded; and a relay station configured to cause a retransmission of information in case the receiver falsely decoded the codeword, wherein at least one of the sender, the receiver and the relay station is configured as a node in the wireless communication network comprising the sender, the relay station and the receiver, the node comprising:

a processor configured to allocate a resource in case of a retransmission from the relay station to the receiver in accordance with a method for resource allocation in a wireless communication network including a sender, a relay station and a receiver, wherein the receiver is configured to receive, combine and decode signals received from the sender and the relay station, wherein in case the receiver fails to decode a received signal, a retransmission of information from the relay station to the receiver is initiated, and wherein a resource necessary for retransmission is determined based on a relay protocol upon which the relay station operates, a channel quality of a channel between the sender and the receiver via the relay station, and a direct channel between the sender and the receiver.

* * * * *